(12) United States Patent
Zhong et al.

(10) Patent No.: US 7,809,272 B2
(45) Date of Patent: Oct. 5, 2010

(54) SYSTEMS AND METHODS FOR PROVIDING A THREE-PORT RECONFIGURABLE OPTICAL ADD-DROP MULTIPLEXER WITH AN IMPROVED EDGE PROFILE AND ADD/DROP FLEXIBILITY

(75) Inventors: Shan Zhong, Ellicott City, MD (US); Jean-Luc Archambault, Severna Park, MD (US)

(73) Assignee: Ciena Corporation, Linthicum, MD (US)

( * ) Notice: Subject to any disclaimer, the term of this patent is extended or adjusted under 35 U.S.C. 154(b) by 592 days.

(21) Appl. No.: 11/834,363

(22) Filed: Aug. 6, 2007

(65) Prior Publication Data

US 2009/0041463 A1  Feb. 12, 2009

(51) Int. Cl.
*H04J 14/02* (2006.01)

(52) U.S. Cl. .......................... 398/85; 398/83; 398/84; 398/79; 398/87; 385/24; 385/37

(58) Field of Classification Search .................. 398/79, 398/82, 83, 84, 85, 86, 87, 88, 59, 45, 48; 385/24, 37, 16, 17, 18, 39, 27

See application file for complete search history.

(56) References Cited

U.S. PATENT DOCUMENTS

| 6,751,372 B2 * | 6/2004 | Feuer et al. ................... 385/24 |
| 7,657,181 B2 * | 2/2010 | Terai et al. .................... 398/83 |

* cited by examiner

*Primary Examiner*—Hanh Phan
(74) *Attorney, Agent, or Firm*—Clements Bernard PLLC; Christopher L. Bernard; Lawrence A. Baratta, Jr.

(57) ABSTRACT

The technology described herein provides a low-cost three-port reconfigurable optical add-drop multiplexer (ROADM) with an improved edge profile and add/drop flexibility. The technology described herein further provides a tunable spectral filter utilizing two sets of gratings and lenses and a two-axis micro-electro-mechanical system (MEMS) mirror with a selectively shaped cut-out disposed within the middle of the collimated optical path.

20 Claims, 7 Drawing Sheets

SYSTEMS AND METHODS FOR PROVIDING A THREE-PORT RECONFIGURABLE OPTICAL ADD-DROP MULTIPLEXER WITH AN IMPROVED EDGE PROFILE AND ADD/DROP FLEXIBILITY

FIELD OF THE INVENTION

The technology described herein relates generally to optical communications networks. More specifically, the technology described herein relates to systems and methods for providing a low-cost three-port reconfigurable optical add-drop multiplexer (ROADM) with an improved edge profile and add/drop flexibility. Furthermore, the technology described herein relates to a tunable spectral filter utilizing two sets of gratings and lenses and a two-axis micro-electro-mechanical systems (MEMS) mirror with a selectively shaped cut-out disposed within the middle of the collimated optical path.

BACKGROUND OF THE INVENTION

Modern optical communications networks utilize wavelength division multiplexing (WDM) to transport data utilizing optical carrier signals transported across optical fibers. WDM allows multiple optical carrier signals to be multiplexed and carried on a single optical fiber. In WDM, optical carrier signals are separated by wavelength, or color, allowing each wavelength to carry a different channel of data. A reconfigurable optical add-drop multiplexer (ROADM) provides the ability to add/drop one or more WDM signals from an optical fiber, remotely switching optical traffic at the wavelength layer. Thus, multiple WDM channels are utilized to transport data in an optical communications network and the various WDM channels may be added/dropped utilizing a ROADM.

In various implementations, a ROADM utilizes optical tuners to add/drop optical carrier signals to an optical fiber. The optical tuner operates to pass an optical carrier signal of a desired wavelength through the optical tuner, while reflecting other wavelengths in the WDM data stream. Under certain circumstances, the optical tuner disturbs wavelengths in the WDM data stream other than the optical carrier signal of the desired wavelength. Such an impact is a "hit." It is desirable to have a "hitless" optical tuner to avoid impacting these other wavelengths.

There are two basic types of ROADMs that can be identified as state-of-the-art technology. One such ROADM design is based on a wavelength selective switch (WSS) or a wavelength blocker (WB) including a tunable filter. This type of high-end ROADM can add/drop any combination of channels (wavelengths) to any port. For example, this ROADM design is disclosed within Ciena CN4200 documentation (Ciena Corporation, Linthicum, Md.).

Another ROADM design includes a three-port hitless and bandwidth-tunable filter. The three-port hitless and bandwidth-tunable filter was proposed to add/drop 1 to N (typically up to N=8 or N=16) consecutive channels anywhere across the operating wavelength band. The cost of this ROADM design is generally much lower. A ROADM design similar in concept to this is a sampling ROADM. This ROADM design, however, lacks the flexibility found in the first ROADM design. Additionally, the efficiency for channel wavelength reuse is low. Furthermore, this ROADM design maintains a poor edge filter profile, limiting its application in a concatenated condition. Thus, what is still needed in the art is a ROADM with an improved edge profile and add/drop flexibility. The technology described herein provides such a system and method.

BRIEF SUMMARY OF THE INVENTION

In various exemplary embodiments, the technology described herein provides systems and methods for a low-cost three-port reconfigurable optical add-drop multiplexer (ROADM) with an improved edge profile and add/drop flexibility. Additionally, the technology described herein provides a tunable spectral filter utilizing two sets of gratings and lenses and a two-axis micro-electromechanical systems (MEMS) mirror with a selectively shaped cut-out disposed within the middle of the collimated optical path.

In one exemplary embodiment, the technology described herein provides a tunable filter. The tunable filter includes a pair of gratings and a pair of transform lenses. The pair of gratings and the pair of transform lenses are utilized for spatially separating and recombining a multiple wavelength input signal. The tunable filter also includes a mirror with a cut-out. The cut-out is of a predetermined shape and is disposed between the transform lenses and within in the middle of a collimated optical path, allowing a wavelength, of the multiple wavelength input signal, to pass through, and allowing another wavelength, of the multiple wavelength input signal, to be reflected. A wavelength, of the multiple wavelength input signal, which passes through the cut-out is a drop signal. A wavelength, of the multiple wavelength input signal, which is reflected by the mirror is an express signal. The tunable filter further includes a two-axis mirror at an input side of the tunable filter. The two-axis mirror is used to control the bandwidth and the wavelength of a drop signal by adjusting the angle and position of the multiple wavelength input signal relative to a first grating of the pair of gratings. The mirror is a MEMS mirror with two axes of rotation, one axis representing bandwidth and one axis representing wavelength. The optical bandwidth becomes wider or narrower as determined by the shape of the cut-out. The tunable filter is operative for hitless tuning. Hitless tuning is achieved by moving a dispersed light line of the spatially separated multiple wavelength input signal away from the cut-out area, changing the wavelength and then moving back to an appropriate position to achieve a desired bandwidth. The shape of cut-out has to follow certain design rules that allow the dispersed light line to move away from the cut-out area without affecting the existing express channels. The tunable filter still further includes a cylindric transform lens, the lens being disposed between the two-axis mirror at an input side of the tunable filter and the first grating of the pair of gratings.

In another exemplary embodiment, the technology described herein provides that the cut-out of a predetermined shape is in the shape of a staircase profile, improving an edge profile of the filter response without changing the optics design and relaxing the tolerances for control of the two-axis mirror.

In a further exemplary embodiment, the technology described herein provides that the cut-out of a predetermined shape is of a varied shape, allowing multiple combinations of add/drop channels, including non-adjacent channels, to be encoded.

In a still further exemplary embodiment, the technology described herein provides a second tunable filter with a cut-out that is of a varied shape that is complementary to the shape of the cut-out of the first tunable filter, further improving the flexibility of a ROADM node by allowing a large number of channel combinations to be added/dropped. The tunable filter is a three-port hitless ROADM. The tunable filter is concatenated with a second three-port hitless ROADM, wherein the cut-out of the second three-port hitless ROADM is complementary to the cut-out of the first three-port hitless ROADM, thereby providing a larger number of channel combinations to be added/dropped.

In a still further exemplary embodiment, the technology described herein provides a method for filtering an optical signal utilizing a tunable filter. The method includes providing a multiple wavelength input signal. The method also includes utilizing a tunable filer comprising a pair of gratings and a pair of transform lenses, wherein the pair of gratings and the pair of transform lenses are spatially separating and recombining the multiple wavelength input signal; and utilizing a mirror with a cut-out, the cut-out being of a predetermined shape and disposed between the transform lenses and disposed within in the middle of a collimated optical path, allowing a wavelength, of the multiple wavelength input signal, to pass through, and allowing another wavelength, of the multiple wavelength input signal, to be reflected. A wavelength, of the multiple wavelength input signal, which passes through the cut-out is a drop signal. A wavelength, of the multiple wavelength input signal, which is reflected by the mirror is an express signal. The method further includes utilizing a two-axis mirror at an input side of the tunable filter, controlling the bandwidth and the wavelength of a drop signal by adjusting the angle and position of the multiple wavelength input signal relative to a first grating of the pair of gratings. The mirror is a MEMS mirror with two axes of rotation, one axis representing bandwidth and one axis representing wavelength. The optical bandwidth becomes wider or narrower as determined by the shape of the cut-out. The tunable filter is operative for hitless tuning. Hitless tuning is achieved by moving a dispersed light line of the spatially separated multiple wavelength input signal away from the cut-out area, changing the wavelength and then moving back to an appropriate position to achieve a desired bandwidth. The method still further includes utilizing a cylindric transform lens, the lens being disposed between the two-axis mirror at an input side of the tunable filter and the first grating of the pair of gratings.

In a still further exemplary embodiment, the method provides that the cut-out of a predetermined shape is in the shape of a staircase profile, improving an edge profile of the filter response without changing the optics design and relaxing the tolerances for control of the two-axis mirror.

In a still further exemplary embodiment, the method provides that the cut-out of a predetermined shape is of a varied shape, allowing arbitrary combinations of add/drop channels, including non-adjacent channels, to be encoded.

In a still further exemplary embodiment, the method provides a second tunable filter with a cut-out that is of a varied shape that is complementary to the shape of the cut-out in the first tunable filter, further improving the flexibility of a ROADM node by allowing a large number of channel combinations to be added/dropped. The tunable filter is a three-port hitless ROADM. The method also provides concatenating the tunable filter with a second three-port hitless ROADM, wherein the cut-out of the second three-port hitless ROADM is complementary to the cut-out of the first three-port hitless ROADM, thereby providing a larger number of channel combinations to be added/dropped.

Advantageously, the technology described herein provides a ROADM with an improved, sharper edge filter profile. Additionally, the technology described herein provides enhanced add/drop flexibility. Furthermore, the technology described herein provides a superior, low-cost ROADM.

There has thus been outlined, rather broadly, the features of the present invention in order that the detailed description that follows may be better understood, and in order that the present contribution to the art may be better appreciated. There are additional features of the invention that will be described and which will form the subject matter of the claims. Additional aspects and advantages of the present invention will be apparent from the following detailed description of an exemplary embodiment which is illustrated in the accompanying drawings. The invention is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

Figure 1:
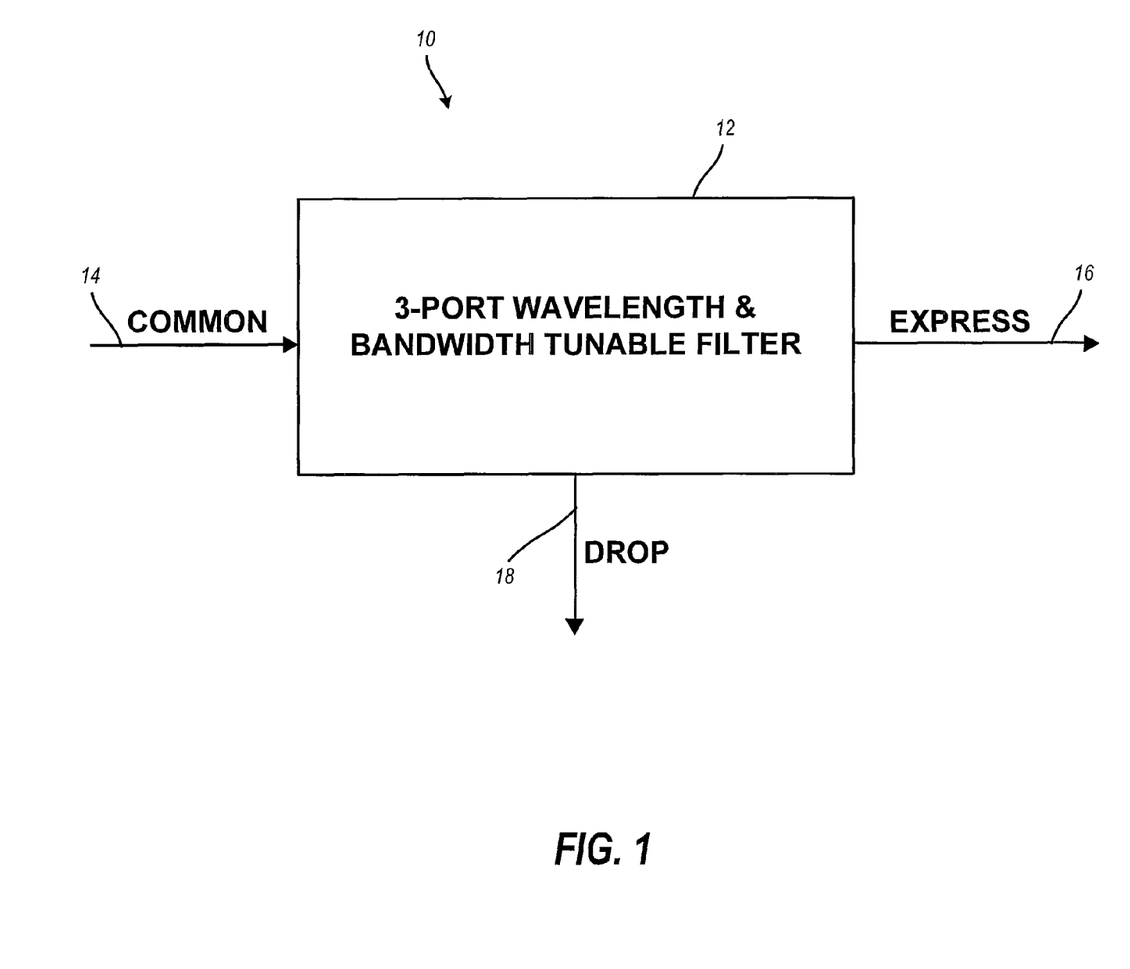
FIG. 1 is a schematic diagram illustrating a conceptual design of three-port hitless wavelength and bandwidth-tunable filter, according to an embodiment of the present invention, illustrating conceptually the common input port, the express port, and the drop port.

Referring now to FIG. 1, a conceptual design 10 of the three-port hitless wavelength and bandwidth-tunable filter 12 is shown. The common port 14, the express port 16, and the drop port 18 are shown. Incoming light enters the filter 12 through the common port 14.

Figure 2:
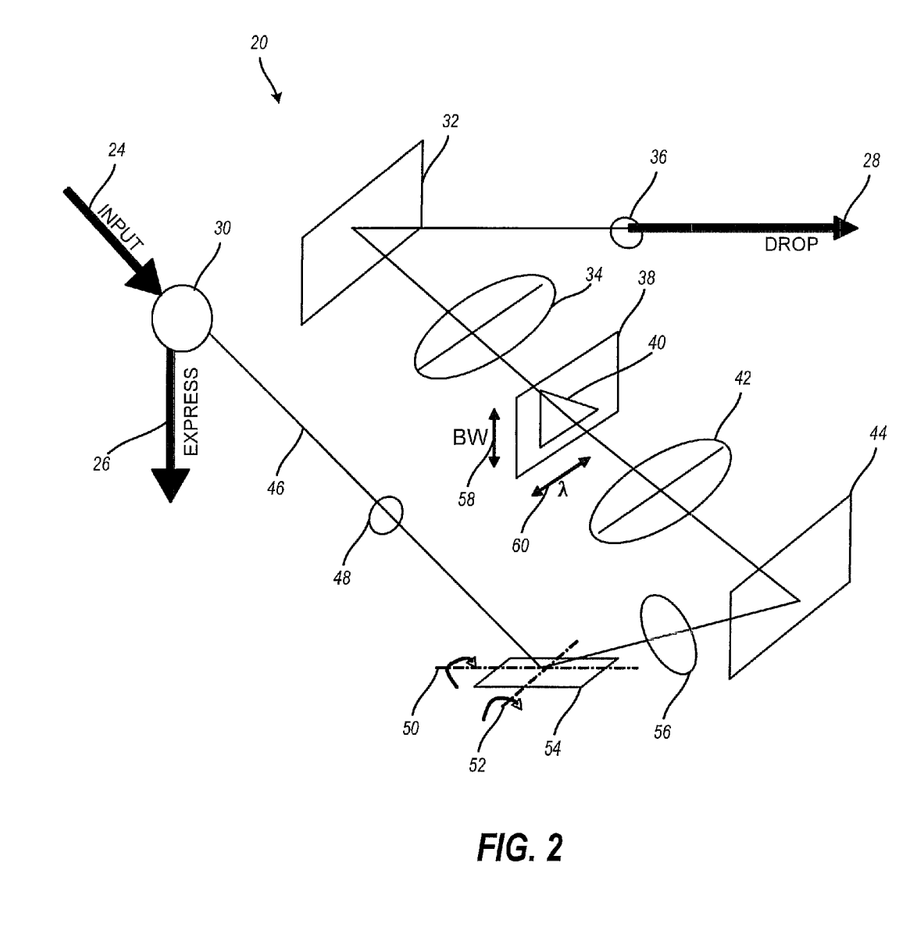
FIG. 2 is a schematic diagram illustrating a functional design of three-port hitless wavelength and bandwidth-tunable filter, according to an embodiment of the present invention, illustrating, in particular, the mirror with a patterned cut-out, the two-axis MEMS mirror, and the optical path through the filter.

Referring now to FIG. 2, the functional design 20 of the three-port hitless wavelength and bandwidth-tunable filter of FIG. 1 is shown illustrating the optical path 46 through the filter. Incoming light enters a circulator 30 at input channels 24, ultimately destined for either the express 26 or drop 28 channels. In this design, the incoming light is spread and recombined by two sets of gratings 32, 44 and lenses 34, 42. A mirror 38 with a triangularly shaped cut-out 40 is inserted in the middle of the collimated optical path 46. The light passing through the cut-out 40 is the drop signal 28 and the light reflected by the mirror 38 is the express signal 26. A two-axis micro-electromechanical system (MEMS) mirror 54, with axes 50, 52, at the input side is used to control the bandwidth and wavelength of the drop signals by adjusting the angle and position of the light relative to the grating. The axis to control the bandwidth, BW, 58 and the axis to control the wavelength, $\lambda$, 60 are represented on the mirror 38. The three-port hitless wavelength and bandwidth-tunable filter also includes an I/O lens 48, a cylindric transform lens 56, and out lenses 36.

Figure 3:
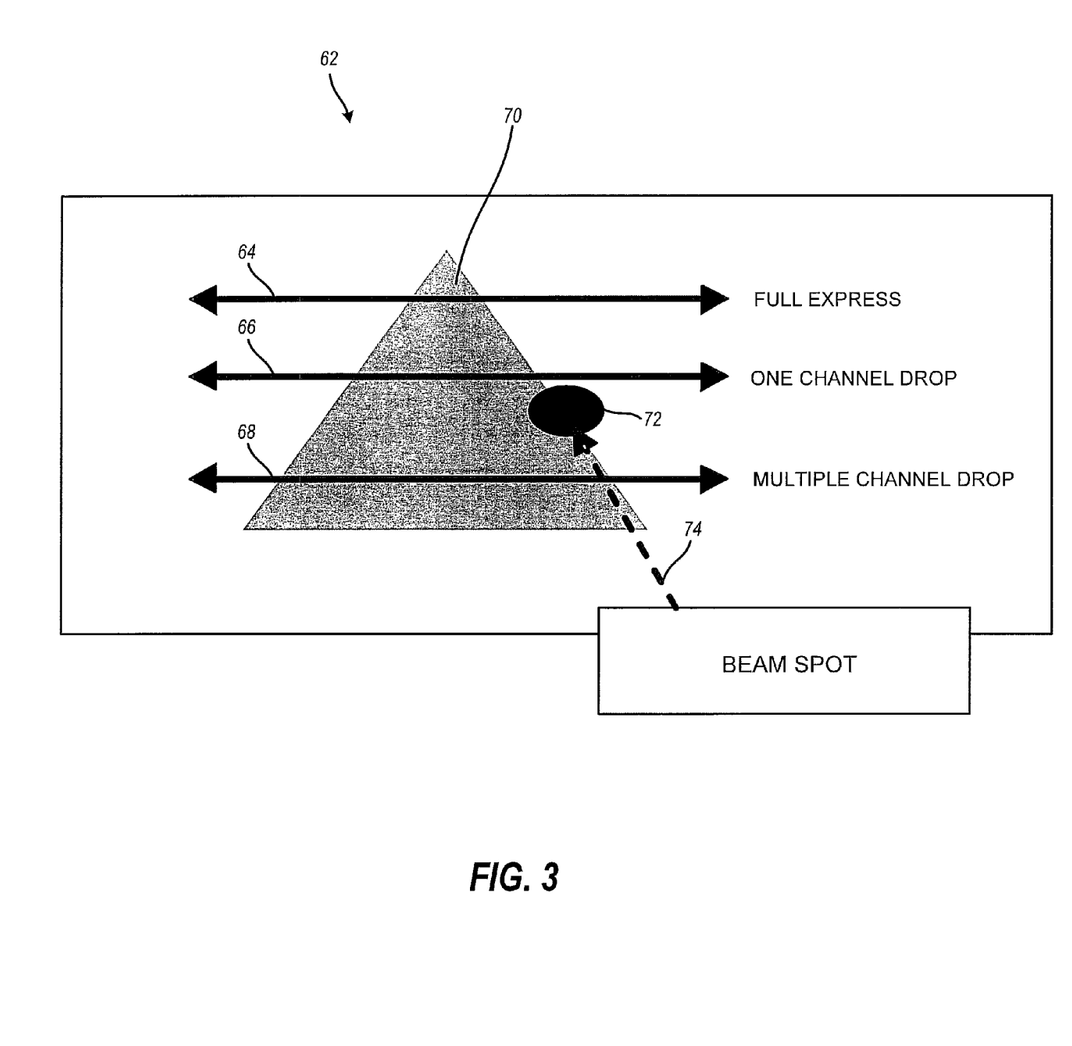
FIG. 3 is schematic diagram illustrating the beam spot, a triangular-shaped mirror cut-out, and the dispersed light (the arrowed lines) as a function of wavelength.

Referring now to FIG. 3, a diagram 62 illustrates dispersed light through a triangular-shaped mirror cut-out 70. The dispersed light (the arrowed lines for full express 64, one channel drop 66, and multiple channel drop 68) is illustrated as a function of wavelength. When the dispersed light is moved up and down by the two-axis MEMS mirror 38 (in FIG. 2), the optical bandwidth becomes wider or narrower as determined by the shape of the mirror cut-out 70. Known mirror cut-outs include those in the shape of a triangle, making the filter bandwidth continuously tunable. Hitless tuning is achieved by moving the dispersed light line 74 away from the cut-out area 70, changing the wavelength and then moving back to appropriate position to achieve the desired bandwidth, based on the design rules of the mirror cut-out 70. The beam spot 72 where the light line 74 intersects with the edge of the mirror cut-out 70 is also shown.

Clearly, mirrors with triangle shape cut-outs 70 can achieve smooth bandwidth tuning, but will produce an optical filter passband with a gradual edge rather than a sharp one, especially if the beam spot size is relative large. To sharpen the edges of the filter response based on this design, the spot size has to be reduced by increasing the focal length of the imaging optics, which has the down size of making the device larger and potentially more expensive.

Figure 4:
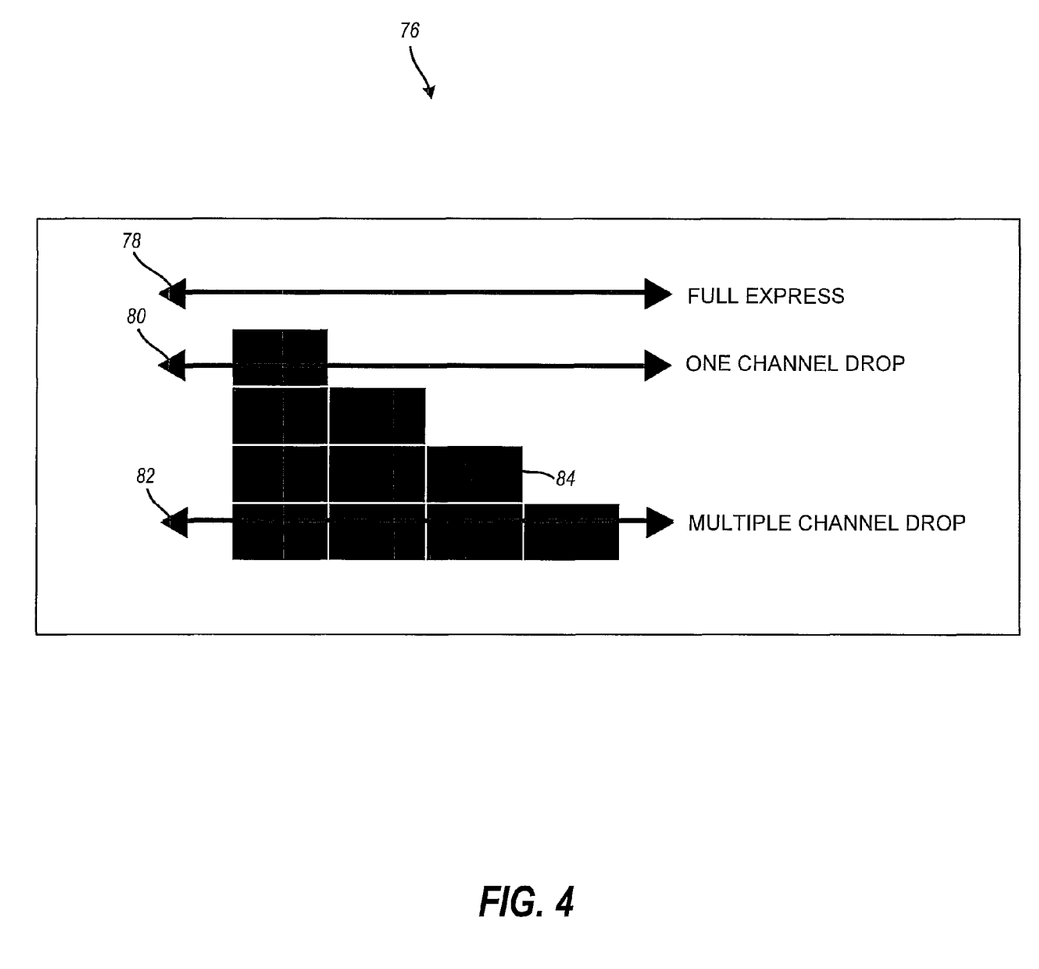
FIG. 4 is a schematic diagram illustrating a staircase-shaped mirror cut-out and the dispersed light (the arrowed lines) as a function of wavelength, according to an embodiment of the present invention.

Referring now to FIG. 4, a diagram 76 illustrates dispersed light through a staircase-shaped mirror cut-out 84. Considering that most practical applications would require adjusting the filter bandwidth across discrete add/drop channels as opposed to continuous bandwidth adjustment, a staircase-shaped mirror cut-out 84 is used. Thus, the edge profile of the filter response will be improved without changing the optics design. The tolerances for MEMS mirror control will also be relaxed. The dispersed light (the arrowed lines for full express 78, one channel drop 80, and multiple channel drop 82) is illustrated as a function of wavelength.

Figure 5:
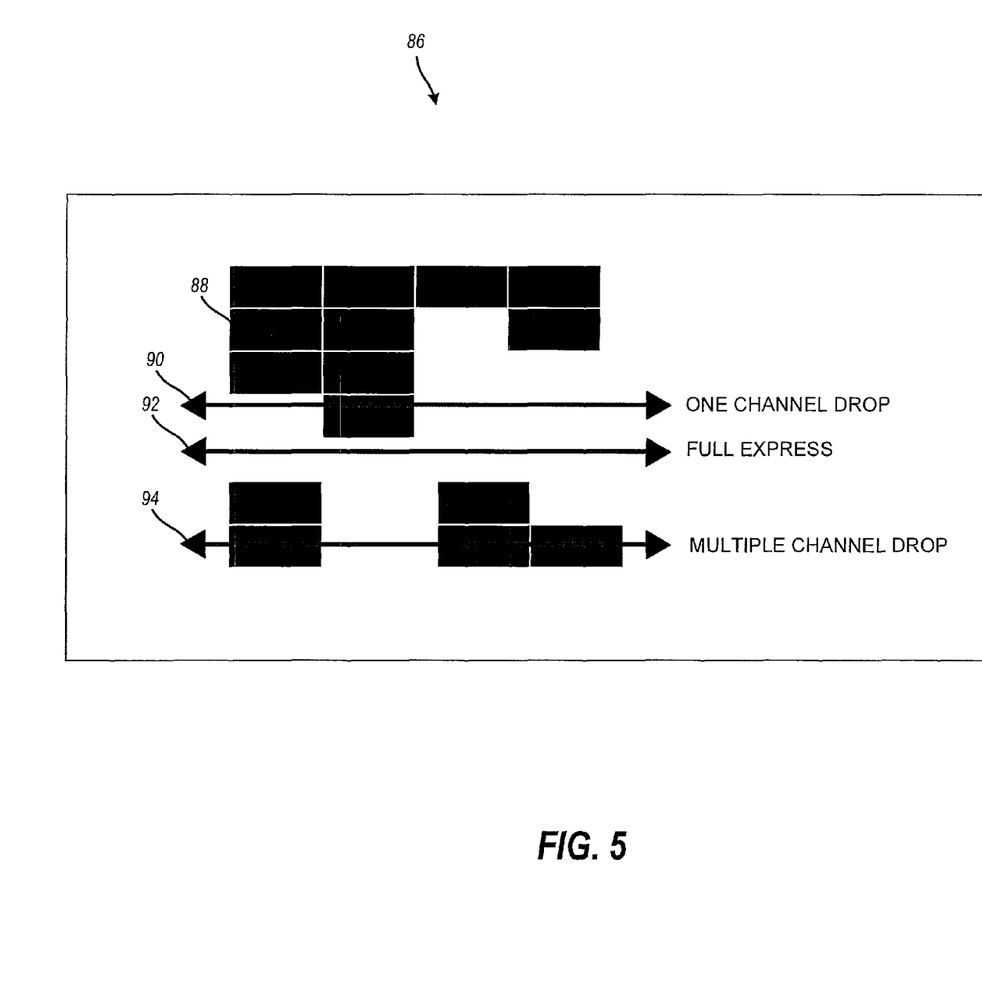
FIG. 5 is a schematic diagram illustrating how multiple combinations of add/drop channels, including non-adjacent channels, are encoded by varying the shape of the mirror cut-out.

Referring now to FIG. 5, a diagram 86 illustrates dispersed light through an arbitrary shaped mirror cut out 88, wherein arbitrary combinations of add/drop channels, including non-adjacent channels, are encoded by varying the shape of the cut-out. The dispersed light (the arrowed lines for one channel drop 90, full express 92, and multiple channel drop 94) is illustrated as a function of wavelength.

Figure 6:
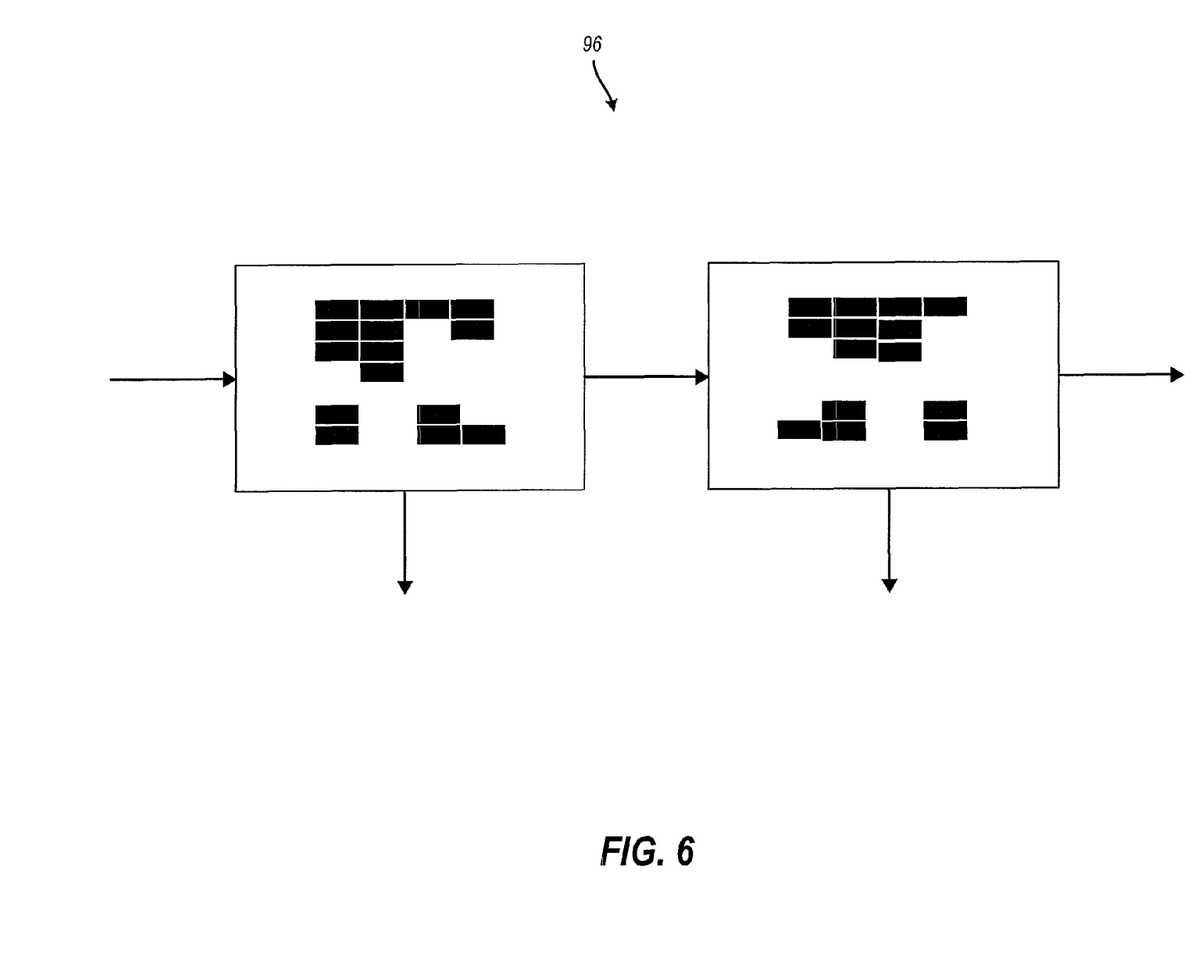
FIG. 6 is a schematic diagram illustrating a combination of two devices with an arbitrary combination of add/drop channels, including non-adjacent channels, that are encoded by varying the shape of the mirror cut-out, as shown in FIG. 5, further improving the flexibility of a ROADM node by allowing a large number of channel combinations to be added/dropped.

By combining two or more such devices, as the one shown in FIG. 5, with complementary patterns, ROADM node flexibility is improved by allowing a large number of channel combinations to be added or dropped. The combination to achieve this improved ROADM node flexibility is illustrated in diagram 96 in FIG. 6.

Figure 7:
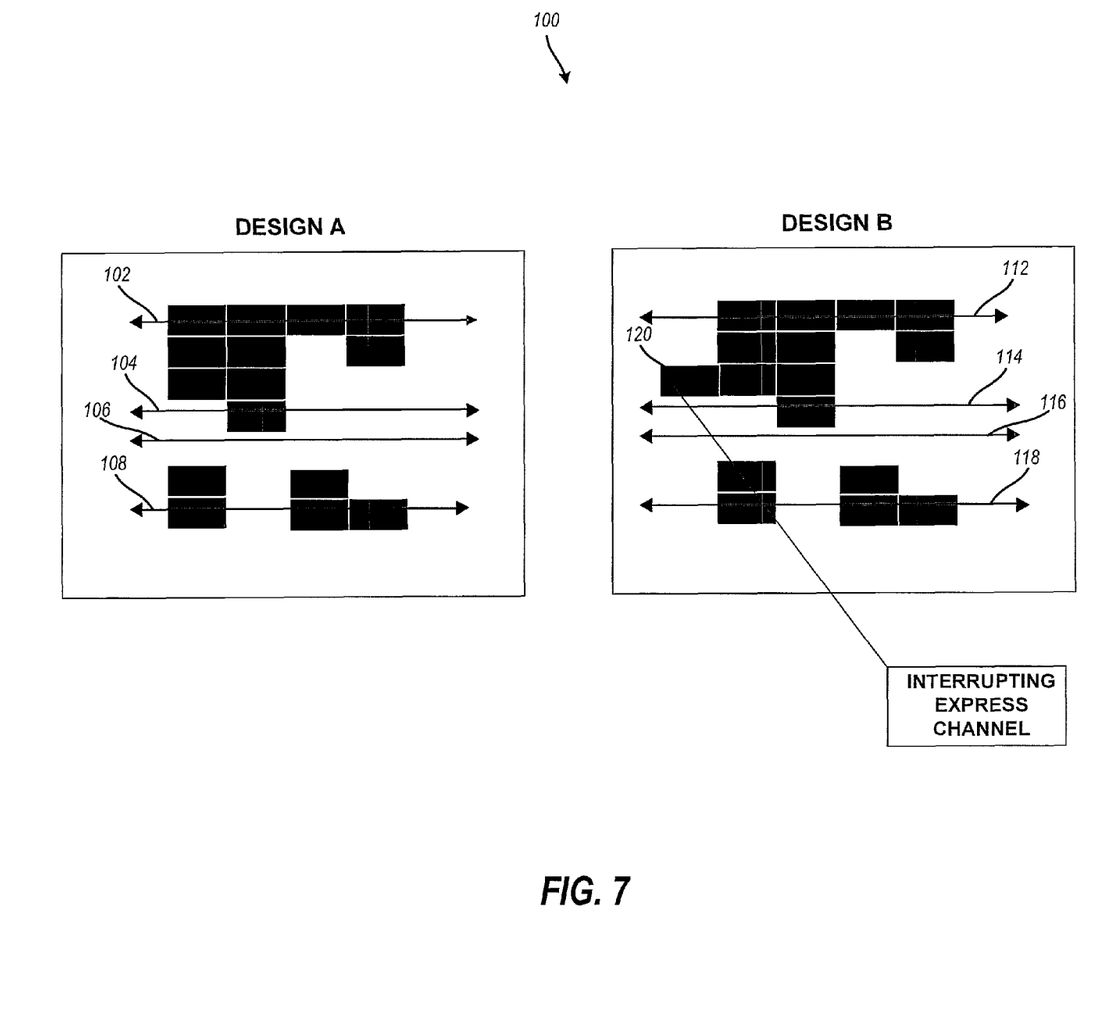
FIG. 7 is a schematic diagram illustrating two different mirror cut-out designs and further illustrating, in particular, the design rules to bear in mind for an add/drop channel plan in order to achieve hitless tuning, wherein design A allows for hitless tuning and design B does not allow for hitless tuning.

Referring now to FIG. 7, a schematic diagram 100 illustrates two different mirror cut-out designs. In order to achieve hitless tuning, there must be no interruption to existing express channels when dispersed light is moved away from the cut-out area. Design A is shown with the dispersed light, expressed as a function of wavelength, represented with the arrowed lines: four channel drop 102, one channel drop 104, full express 106, and multiple channel drop 108. Design B is shown with the dispersed light, expressed as a function of wavelength, represented with the arrowed lines: four channel drop 112, one channel drop 114, full express 116, and multiple channel drop 118. Design B, however, will not provide hitless tuning because there is an interruption 120 to existing express channels.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A tunable filter for use in an optical communications network, comprising:
   a pair of gratings;
   a pair of transform lenses;
   wherein the pair of gratings and the pair of transform lenses are utilized for spatially separating and recombining a multiple wavelength input signal;
   a mirror with a cut-out, the cut-out being of a predetermined shape and disposed in between the transform lenses and disposed within in the middle of a collimated optical path, allowing a wavelength, of the multiple wavelength input signal, to pass through, and allowing another wavelength, of the multiple wavelength input signal, to be reflected;
   wherein a wavelength, of the multiple wavelength input signal, which passes through the cut-out is a drop signal, and a wavelength, of the multiple wavelength input signal, which is reflected by the mirror is an express signal; and
   a two-axis mirror at an input side of the tunable filter, the two-axis mirror used to control the bandwidth and the wavelength of a drop signal by adjusting the angle and position of the multiple wavelength input signal relative to a first grating of the pair of gratings.

2. The tunable filter of claim 1, wherein the mirror is a micro-electromechanical system mirror with two axes of rotation, one axis representing bandwidth and one axis representing wavelength.

3. The tunable filter of claim 1, wherein the optical bandwidth becomes wider or narrower as determined by the shape of the cut-out.

4. The tunable filter of claim 1, wherein the tunable filter is operative for hitless tuning, and hitless tuning is achieved by using a cut-out area based on design rules, moving a dispersed light line of the spatially separated multiple wavelength input signal away from the cut-out area, changing the wavelength and then moving back to an appropriate position to achieve a desired bandwidth.

5. The tunable filter of claim 1, further comprising:
   a cylindric transform lens, the lens being disposed between the two-axis mirror at an input side of the tunable filter and the first grating of the pair of gratings.

6. The tunable filter of claim 1, wherein the cut-out of a predetermined shape is in the shape of a staircase profile, improving an edge profile of the filter response without changing the optics design and relaxing the tolerances for control of the two-axis mirror.

7. The tunable filter of claim 1, wherein the cut-out of a predetermined shape is in a varied shape, allowing multiple combinations of add/drop channels, including non-adjacent channels, to be encoded.

8. The tunable filter of claim 7, further comprising:
a second tunable filter with a cut-out that is in a varied shape that is complementary to the shape of the cut-out in the tunable filter, further improving the flexibility of a ROADM node by allowing a large number of channel combinations to be added or dropped.

9. The tunable filter of claim 1, wherein the tunable filter is a three-port hitless reconfigurable add-drop multiplexer.

10. The tunable filter of claim 9, wherein the tunable filter is concatenated with a second three-port hitless reconfigurable add-drop multiplexer, wherein the cut-out of the second three-port hitless reconfigurable add-drop multiplexer is complementary to the cut-out of the three-port hitless reconfigurable add-drop multiplexer, thereby providing a larger number of channel combinations to be added or dropped.

11. A method for filtering an optical signal utilizing a tunable filter, comprising:
providing a multiple wavelength input signal;
utilizing a tunable filer comprising a pair of gratings and a pair of transform lenses, wherein the pair of gratings and the pair of transform lenses are spatially separating and recombining the multiple wavelength input signal;
utilizing a mirror with a cut-out, the cut-out being of a predetermined shape and disposed in between the transform lenses and disposed within in the middle of a collimated optical path, allowing a wavelength, of the multiple wavelength input signal, to pass through, and allowing another wavelength, of the multiple wavelength input signal, to be reflected;
wherein a wavelength, of the multiple wavelength input signal, which passes through the cut-out is a drop signal, and a wavelength, of the multiple wavelength input signal, which is reflected by the mirror is an express signal; and
utilizing a two-axis mirror at an input side of the tunable filter, controlling control the bandwidth and the wavelength of a drop signal by adjusting the angle and position of the multiple wavelength input signal relative to a first grating of the pair of gratings.

12. The method for filtering an optical signal utilizing a tunable filter of claim 11, wherein the mirror is a microelectromechanical system mirror with two axes of rotation, one axis representing bandwidth and one axis representing wavelength.

13. The method for filtering an optical signal utilizing a tunable filter of claim 11, wherein the optical bandwidth becomes wider or narrower as determined by the shape of the cut-out.

14. The method for filtering an optical signal utilizing a tunable filter of claim 11, wherein the tunable filter is operative for hitless tuning, and hitless tuning is achieved by using a cut-out area based on design rules, moving a dispersed light line of the spatially separated multiple wavelength input signal away from the cut-out area, changing the wavelength and then moving back to an appropriate position to achieve a desired bandwidth.

15. The method for filtering an optical signal utilizing a tunable filter of claim 11, further comprising:
utilizing a cylindric transform lens, the lens being disposed between the two-axis mirror at an input side of the tunable filter and the first grating of the pair of gratings.

16. The method for filtering an optical signal utilizing a tunable filter of claim 11, wherein the cut-out of a predetermined shape is in the shape of a staircase profile, improving an edge profile of the filter response without changing the optics design and relaxing the tolerances for control of the two-axis mirror.

17. The method for filtering an optical signal utilizing a tunable filter of claim 11, wherein the cut-out of a predetermined shape is in a varied shape, allowing multiple combinations of add/drop channels, including non-adjacent channels, to be encoded.

18. The method for filtering an optical signal utilizing a tunable filter of claim 17, further comprising:
utilizing a second tunable filter with a cut-out that is in a varied shape that is complementary to the shape of the cut-out in the tunable filter, further improving the flexibility of a ROADM node by allowing a large number of channel combinations to be added or dropped.

19. The method for filtering an optical signal utilizing a tunable filter of claim 11, wherein the tunable filter is a three-port hitless reconfigurable add-drop multiplexer.

20. The method for filtering an optical signal utilizing a tunable filter of claim 19, further comprising:
concatenating the tunable filter with a second three-port hitless reconfigurable add-drop multiplexer, wherein the cut-out of the second three-port hitless reconfigurable add-drop multiplexer is complementary to the cut-out of the three-port hitless reconfigurable add-drop multiplexer, thereby providing a larger number of channel combinations to be added or dropped.

* * * * *